United States Patent
Lee (10) Patent No.: US 7,881,305 B2
(45) Date of Patent: Feb. 1, 2011

(54) NETWORK SYSTEM AND METHOD FOR RELAYING COMMUNICATION BETWEEN DEVICES

(75) Inventor: Myung-kyu Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 12/131,200

(22) Filed: Jun. 2, 2008

(65) Prior Publication Data
US 2009/0180496 A1 Jul. 16, 2009

(30) Foreign Application Priority Data
Jan. 16, 2008 (KR) .................... 10-2008-0004912

(51) Int. Cl.
*H04L 12/28* (2006.01)
(52) U.S. Cl. ................................ 370/395.52
(58) Field of Classification Search ............ 348/207.99, 348/211.99, 211.1, 211.3
See application file for complete search history.

(56) References Cited

U.S. PATENT DOCUMENTS

| | | | |
|---|---|---|---|
| 6,473,423 B1* | 10/2002 | Tebeka et al. ................ | 370/352 |
| 7,392,046 B2* | 6/2008 | Leib et al. .................... | 455/423 |
| 7,567,575 B2* | 7/2009 | Chen et al. .................. | 370/401 |
| 2002/0122416 A1* | 9/2002 | Xu et al. ...................... | 370/352 |
| 2003/0084047 A1* | 5/2003 | Williamson .................. | 707/10 |
| 2005/0207403 A1* | 9/2005 | Katayama et al. ............ | 370/352 |
| 2005/0232301 A1* | 10/2005 | Lee et al. ...................... | 370/464 |
| 2007/0097878 A1* | 5/2007 | Morioka et al. ............. | 370/254 |
| 2007/0147298 A1* | 6/2007 | Miao et al. .................. | 370/331 |
| 2008/0037571 A1* | 2/2008 | Hetzel et al. ................ | 370/408 |
| 2008/0072312 A1* | 3/2008 | Takeyoshi et al. ............. | 726/15 |
| 2008/0162659 A1* | 7/2008 | Jia et al. ...................... | 709/207 |
| 2008/0165789 A1* | 7/2008 | Ansari et al. ................ | 370/401 |
| 2008/0170511 A1* | 7/2008 | Shorty et al. ................ | 370/254 |
| 2009/0141117 A1* | 6/2009 | Elberbaum ................ | 348/14.04 |
| 2009/0238108 A1* | 9/2009 | Nakae et al. ................ | 370/315 |

* cited by examiner

*Primary Examiner*—Chi H Pham
*Assistant Examiner*—Fan Ng
(74) *Attorney, Agent, or Firm*—Sughrue Mion, PLLC

(57) ABSTRACT

Provided is a network system for relaying communication between devices communicating with the Internet using different communication networks. The network system includes a first home network controller which controls first home network devices within a household; a repeater that is connected to the Internet via a first communication network and which relays communication between the Internet and the first home network controller; a second home network controller that is connected to the Internet via a second communication network and which relays communication between the Internet and each of second home network devices within the household; and a management server that is connected to the Internet and relays communication between the first and second home network devices within the household, wherein the first and second home network devices communicate using the first and second communication networks, respectively.

17 Claims, 6 Drawing Sheets

NETWORK SYSTEM AND METHOD FOR RELAYING COMMUNICATION BETWEEN DEVICES

CROSS-REFERENCE TO RELATED PATENT APPLICATION

This application claims the benefit of Korean Patent Application No. 10-2008-0004912, filed on Jan. 16, 2008, in the Korean Intellectual Property Office, the disclosure of which is incorporated herein in its entirety by reference.

BACKGROUND OF THE INVENTION

1. Field of the Invention

Exemplary embodiments of the present invention relate to a network system and method for relaying communication between devices.

2. Description of the Related Art

Recent remarkable advancement of home networking technologies has provided a high degree of convenience to users. However, despite this home networking boost, home networks built in old, obsolete apartment buildings have difficulty in connecting to the Internet, or tend to suffer low quality communication when they are connected to the Internet, thereby causing user inconvenience.

Figure 1:
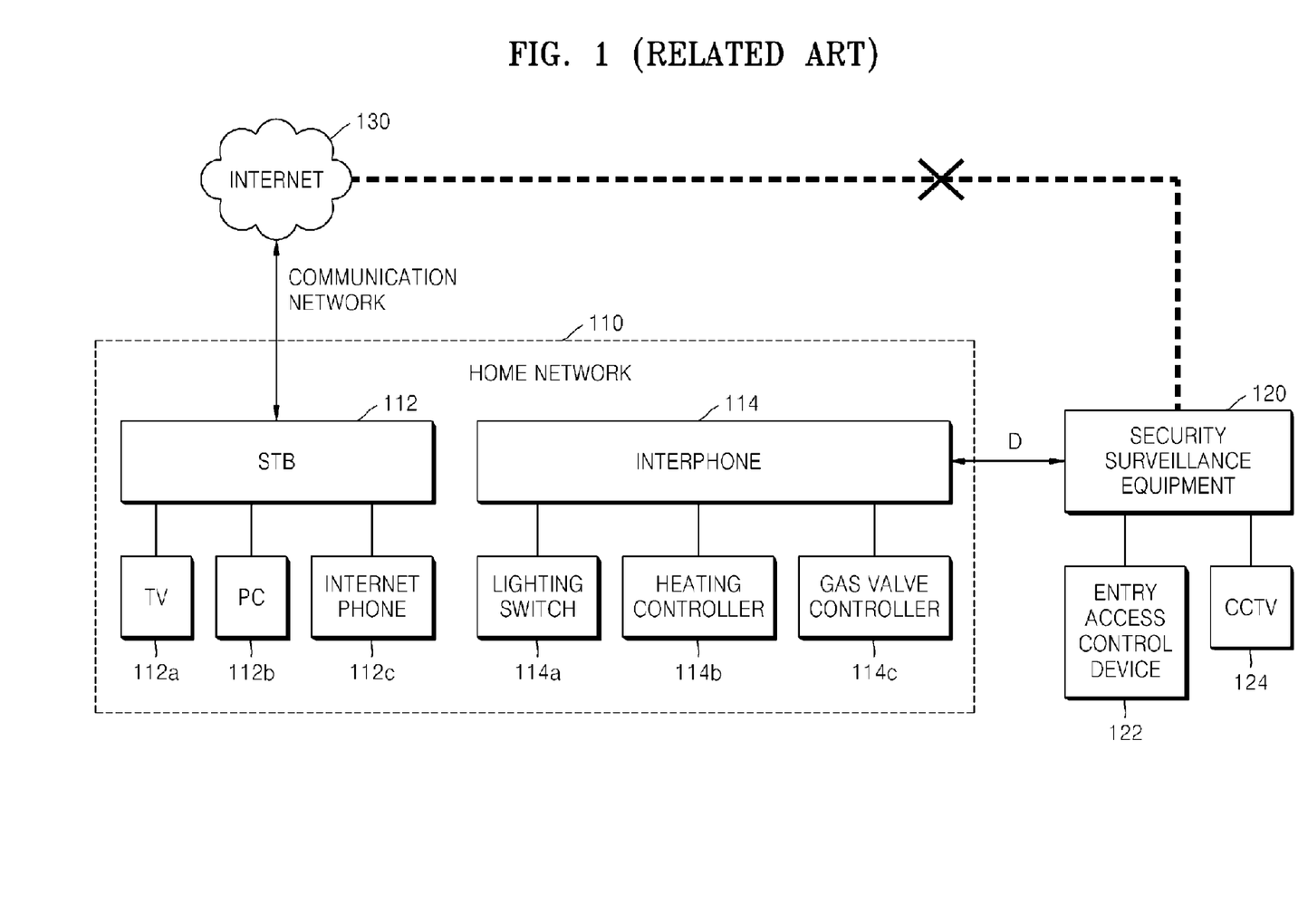
FIG. 1 illustrates an example of a related art home network.

FIG. 1 illustrates an example of a related art indoor home network 110.

Referring to FIG. 1, the indoor home network 110 includes a set-top box (STB) 112, an interphone 114, and a plurality of home network devices 112a through 112c and 114a through 114c respectively connected to the STB 112 and the interphone 114. The plurality of home network devices 112a through 112c and 114a through 114c are hereinafter respectively referred to as a TV 112a, a PC 112b, an Internet phone 112c, a lighting switch 114a, a heating controller 114b, and a gas valve controller 114c. More specifically, the STB 112 is connected to the Internet 130, the TV 112a, the PC 112b, and the Internet phone 112c via a Local Area Network (LAN), relaying communication between the Internet 130 and each of the TV 112a, the PC 112b, and the Internet phone 112c.

The interphone 114 is connected to security surveillance equipment 120, lighting switch 114a, heating controller 114b, and gas valve controller 114c using RS-485 communication to communicate with security surveillance equipment 120 and control the lighting switch 114a, heating controller 114b, and gas valve controller 114c.

The security surveillance equipment 120 is linked to a plurality of different home networks including the home network 110, and in particular, to each of a number of interphones within different home networks to control entry and access to a building. In this case, the security surveillance equipment 120 uses an entry access control device 122 and a closed circuit television (CCTV) 124 for entry and access control.

The configuration shown in FIG. 1 has the problem that services do not interact between the Internet phone 114 and the STB 112 because the security surveillance equipment 120 connected to the interphone 114 via RS-485 is not connected to the Internet 130 while the STB 112 is connected thereto using the LAN.

Figure 2:
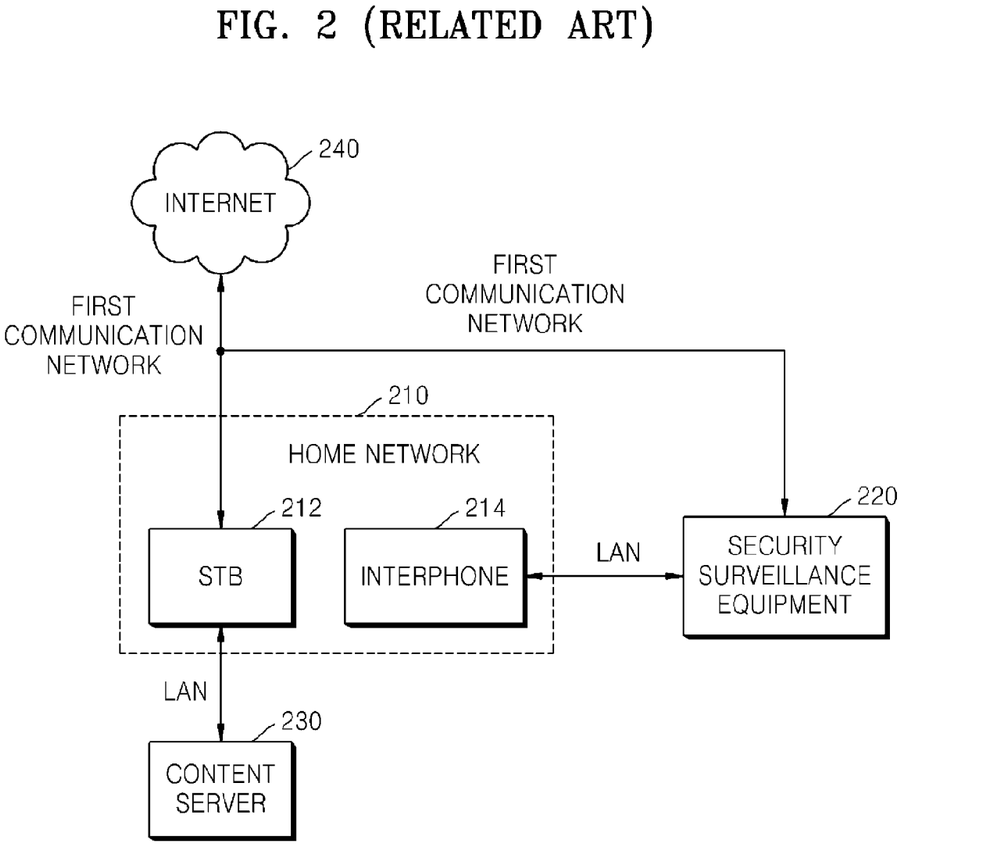
FIG. 2 illustrates another example of a related art home network.

FIG. 2 illustrates another example of a related art indoor home network 210.

For convenience of explanation, the home network devices 112a through 112c and 114a through 114c are not shown in FIG. 2. Referring to FIG. 2, an STB 212 and an interphone 214, within the indoor home network 210, are respectively connected to content server 230 and security surveillance equipment 220 using LAN communication.

Both of the STB 212 and the security surveillance equipment 220 are connected to the Internet via a first communication network for communication, so that services can interact between the STB 212 and the interphone 214. For example, this configuration enables a user to control a gas valve controller connected to the interphone 214 through a TV connected to the STB 212.

The first communication network is an existing network that has problems such as narrow bandwidth and unguaranteed Quality of Service (QoS), thereby causing an inconvenience when the STB 212 receives real-time broadcast content or large size content over the Internet. To overcome this problem, an approach to receiving real-time broadcast content or large size content from a content server 230 has been proposed. That is, the configuration shown in FIG. 2 includes the content server 230 that stores large size content. The STB 212 receives real-time broadcast content or large size content from the content server 230. However, if content that the STB 212 desires to receive is not stored in the content server 230, this approach suffers still the above problem because the STB 212 still has to receive the desired content from the Internet via the first communication network.

Figure 3:
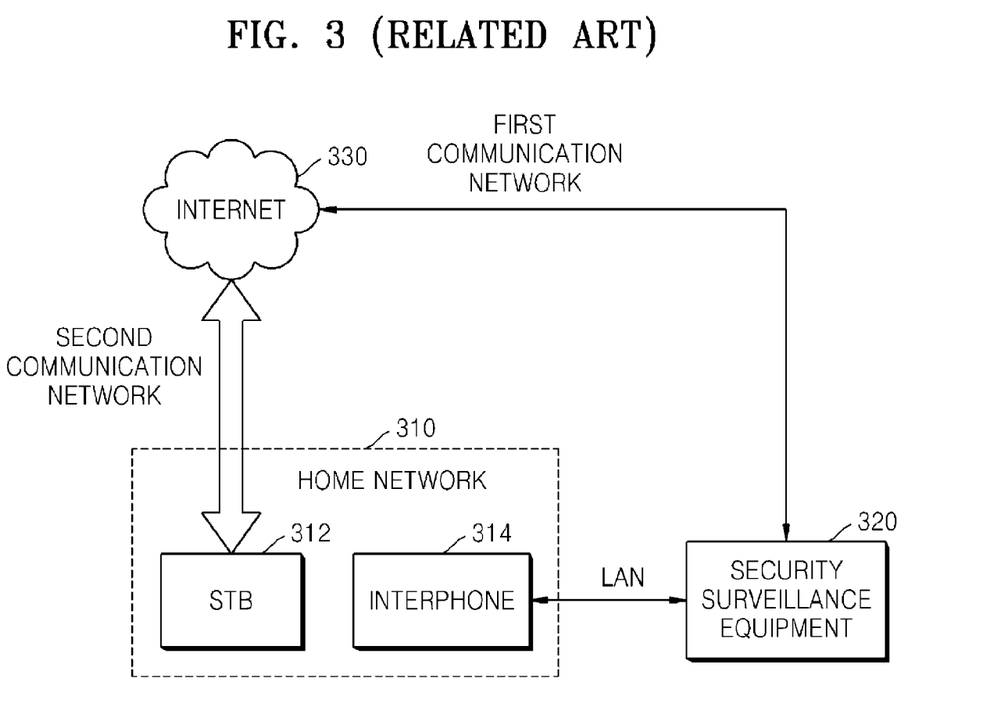
FIG. 3 illustrates another example of a related art home network.

FIG. 3 illustrates another example of a related art indoor home network 310.

Referring to FIG. 3, unlike in the home network 210 of FIG. 2, an STB 312 is connected to the Internet 330 via a second communication network with guaranteed QoS and wider bandwidth than a first communication network. That is, in this example, the indoor home network 310 is connected to the Internet 330 via the second communication network so as to allow communication with the Internet 330 using the high quality second communication network instead of the first communication network previously built by a user.

The configuration shown in FIG. 3 allows the STB 312 to communicate with the Internet 330 using the wide bandwidth second communication network, thus eliminating the need for the content server (230 in FIG. 2) while sustaining entry and access control services provided via the first communication network.

However, the home network 310 is configured such that the STB 312 is connected to the Internet 330 via the second communication network while an interphone 314 is connected to security surveillance equipment 320 connected to the Internet via the first communication network. Thus, this configuration has a drawback in that services cannot interact between the STB 312 and the interphone 314 due to the use of different communication networks for connection with the Internet 330. That is, unlike the home network 210 shown in FIG. 2, the home network 310 cannot allow a user to control a device such as a gas valve controller connected to the interphone 314 through a device such as a TV connected to the STB 312.

SUMMARY OF THE INVENTION

Exemplary embodiments of the present invention provide a network system and method for relaying communication between devices that communicate with the Internet using different communication networks.

According to an aspect of the present invention, there is provided a network system for relaying communication between devices, including: a first home network controller which controls first home network devices within a household; a repeater that is connected to the Internet via a first communication network and which relays communication between the Internet and the first home network controller; a second home network controller that is connected to the Internet via a second communication network and which relays communication between the Internet and each of second home network devices within the household; and a management server that is connected to the Internet and relays communication between the first and second home network devices within the household, where the first and second home network devices communicate using the first and second communication networks, respectively.

The management server may receive information about the first and second home network devices, assign device identifiers to the first and second home network devices based on the received information, and relay communication between the first and second home network devices using the device identifiers.

Upon receipt of a request for allocating IP addresses to the first and second home network devices, the management server may assign IP addresses to the first and second home network devices and may relay communication between the first and second home network devices using the IP addresses together with the device identifiers.

The first and second home network controllers may be located within the same or different households. If the first and second home network controllers are located within the different households, the management server may relay the communication using home identifiers used to identify the different households together with the device identifiers.

The information about the first and second home network devices may include a number of the first and second home network devices respectively connected to the first and second home network controllers and information about each type of the home network devices.

The first home network controller may be connected to the repeater using RS-485 or LAN communication.

The first home network controller may be an interphone, the repeater may be security surveillance equipment that is connected to a plurality of interphones within different households and which controls entry and access to the households, and the second home network controller may be a set-top box.

The first home network devices may include at least one of a lighting switch, a heating controller, a gas valve controller, and a door lock. The second home network devices may include at least one of a TV, a PC, and an Internet phone.

The first communication network may be an existing communication network, and the second communication network may have a wider bandwidth and higher QoS than the first communication network.

According to another aspect of the present invention, there is provided a method for relaying communication between first and second home network devices respectively communicating with the Internet via first and second communication networks, the method including: receiving information about the first and second home network devices; assigning device identifiers to the first and second home network devices based on the received information; and relaying communication between the first and second home network devices using the device identifiers.

The method may further include receiving a request for allocating IP addresses to the first and second home network devices and assigning IP addresses to the first and second home network devices in response to the request. The communication may be relayed using the IP addresses together with the device identifiers.

According to another aspect of the present invention, there is provided a computer readable medium having embodied thereon a computer program for executing the above-mentioned method.

BRIEF DESCRIPTION OF THE DRAWINGS

The above and other exemplary aspects and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 4:
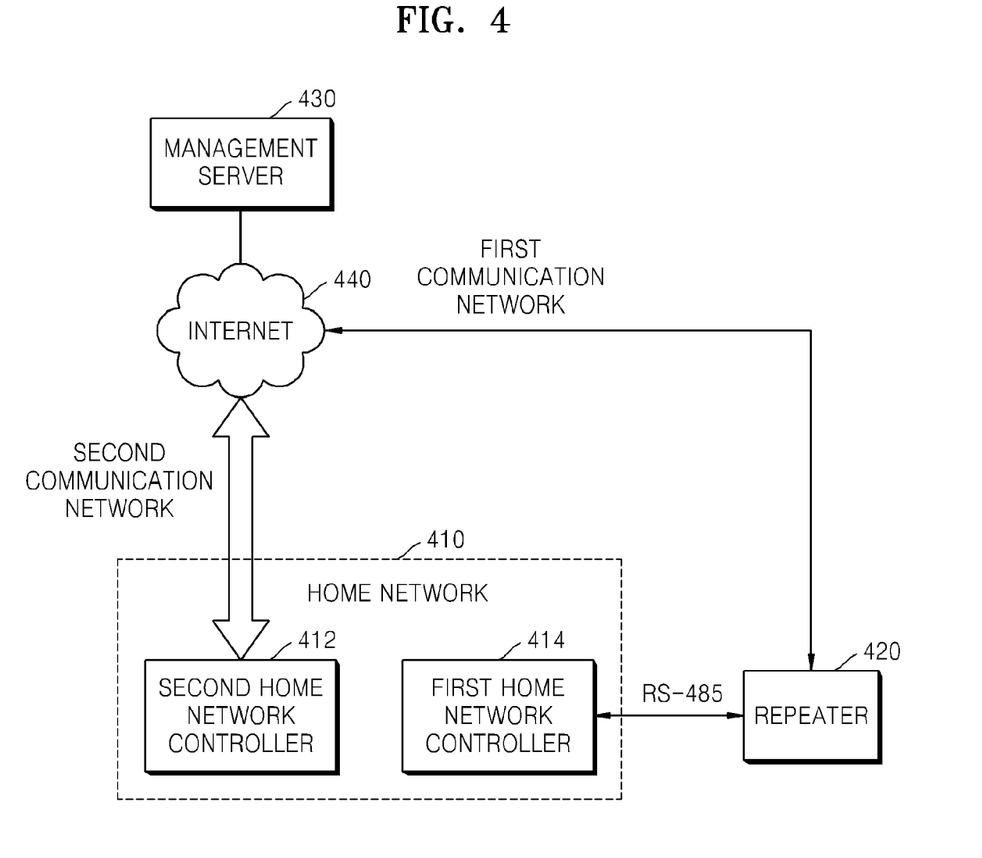
FIG. 4 illustrates a network system for relaying communication between devices according to an exemplary embodiment of the present invention.

FIG. 4 illustrates a network system for relaying communication between devices according to an exemplary embodiment of the present invention. The network system according to the present embodiment is designed to solve the problems of the related art home network 110 shown in FIG. 1.

Referring to FIG. 4, the network system according to the present embodiment includes an indoor home network 410, a repeater 420, and a management server 430. For convenience of explanation, the network system further includes the Internet 440.

The home network 410 includes first and second home network controllers 414 and 412. Although not shown in FIG. 4, it is assumed herein that first and second home network devices are respectively connected to the first and second home network controllers 414 and 412. The first home network controller 414 controls the first home network devices within the home network 410.

In this case, the first home network devices may include at least one of a lighting switch, a heating controller, a gas valve controller, and a door lock.

The repeater 420 is connected to the Internet 440 via a first communication network and relays communication between the Internet 440 and the first home network controller 414.

Although the repeater 420 is connected to the first home network controller 414 using RS-485 communication as in a related art network system shown in FIG. 1, the network system of FIG. 4 is different from the related art network system in that the repeater 420 is connected to the Internet 440.

The repeater 420 may be configured for connection to the Internet 440 by adding a modem to or making some changes to the configuration of the security surveillance equipment 120. This enables the use of existing equipment, thus reducing the installation cost of the repeater 420.

The second home network controller 412 is connected to the Internet 440 via a second communication network and relays communication between the Internet 440 and the second home network devices within the home network 410.

In this case, the second home network devices may include at least one of a TV, a PC, and an Internet phone.

The management server 430 is connected to the Internet 440 and relays communication between the first and second home network devices that communicate with the Internet 440 via the first and second communication networks, respectively. Basically, as described above with reference to FIG. 3, home network devices that communicate with the Internet via a first communication network cannot interact directly with home network devices that communicate with the Internet via a second communication network. However, the network system according to the present embodiment is configured to include the management server 430, enabling communication between the home network devices that respectively communicate via the different first and second communication networks.

For example, if a user sends a control command for a heating controller within his/her household to raise the temperature to a TV, the TV then transmits the input control command to the management server 430 using the second home network controller 412. In this case, the control command is transmitted to the management server 430 via the second communication network and the Internet 440.

Upon receipt of the control command, the management server 430 transmits the control command to the repeater 420 via the Internet 440 and the first communication network. The repeater 420 in turn sends the control command to the first home network controller 414. The first home network controller 414 eventually sends the control command to raise the temperature to the heating controller.

The operation of the management server 430 will be described in more detail later with reference to FIG. 6.

Figure 5:
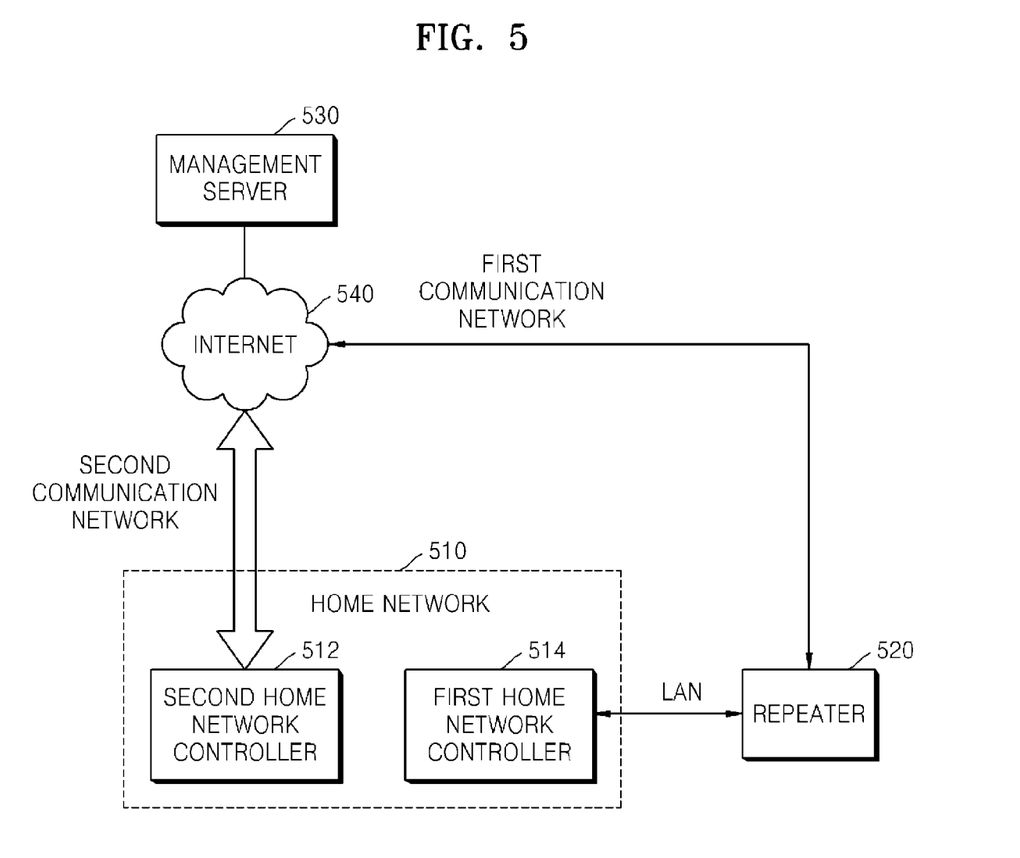
FIG. 5 illustrates a network system for relaying communication between devices according to another exemplary embodiment of the present invention.

FIG. 5 illustrates a network system for relaying communication between devices according to another exemplary embodiment of the present invention.

The network system according to the present embodiment is designed to solve the problems of the related art home networks 210 and 310 shown in FIGS. 2 and 3.

Since the network system of FIG. 5 has the same configuration as the network system of FIG. 4 except that a first home network controller 514 is connected to a repeater 520 via a LAN, a detailed description of the operation of the network system will not be given. Differences between the network system of FIG. 5 and related art network systems will now be described.

Referring to FIGS. 2 and 5, unlike in the related art network system of FIG. 2, a second home network controller 512 is connected to the Internet 540 via a second communication network with a wider bandwidth and higher QoS than a first communication network, thus eliminating the need for the content server 230. Thus, the network system according to the present embodiment does not include the content server 230.

Further, unlike the related art network system of FIG. 3, the network system of FIG. 5 includes the management server 530 which enables service interaction between the first and second network controllers 514 and 512.

The operation of the management server 530 is now described.

Figure 6:
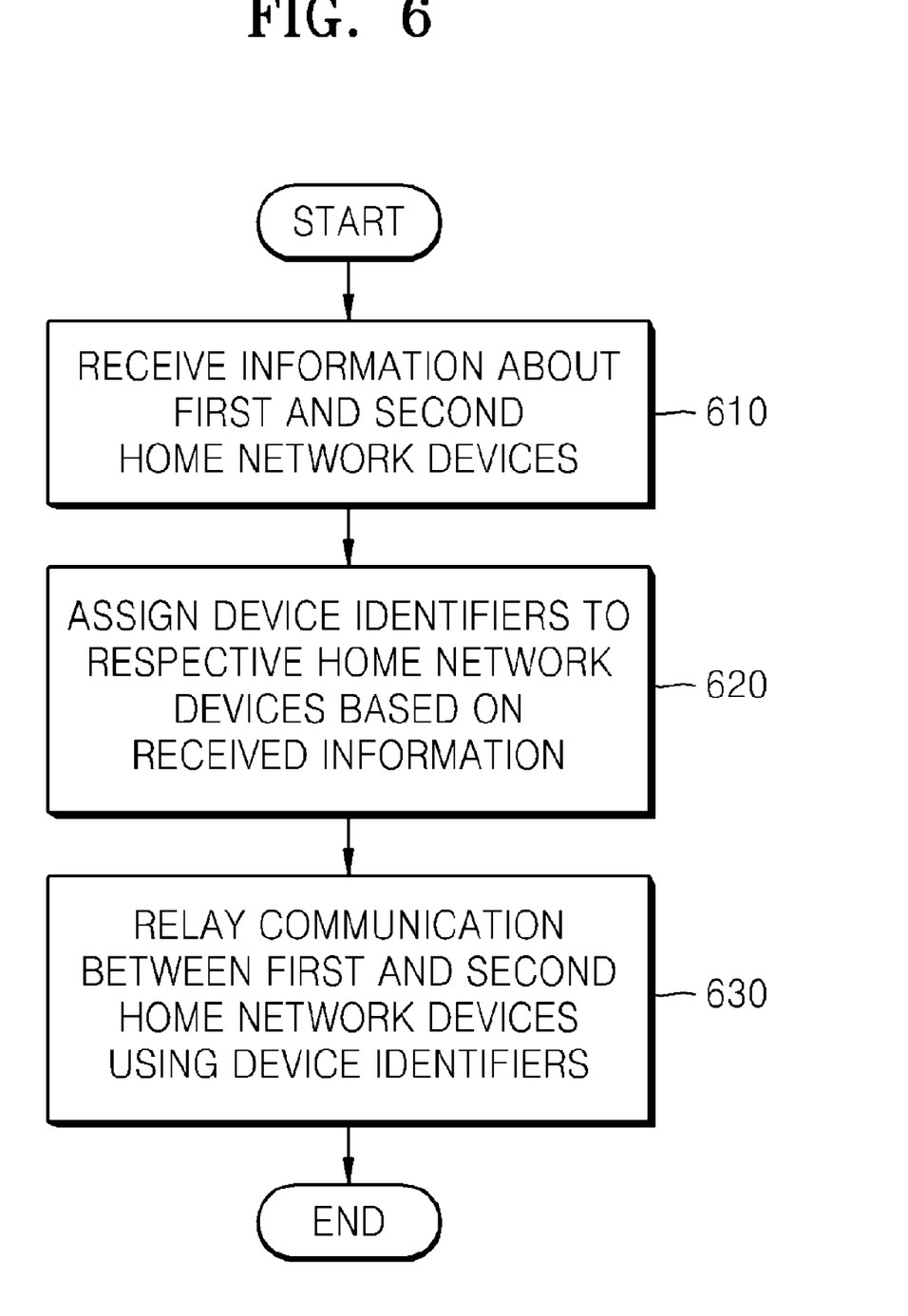
FIG. 6 is a flowchart illustrating a method for relaying communication between devices according to an exemplary embodiment of the present invention.

FIG. 6 is a flowchart illustrating a method for relaying communication between devices according to an exemplary embodiment of the present invention.

Referring to FIGS. 5 and 6, at step 610, the management server 530 receives information about the first and second home network devices from the first home network controller 514 or the repeater 520 and the second home network controller 512. The information about the first and second home network devices contains the number of the first and second home network devices and information about each type of the home network devices.

Upon detecting a change in information about the home network devices previously stored in the management server 530 based on the received information, the management server 530 also updates the previously stored information with the received information.

At step 620, the management server 530 assigns device identifiers to the respective first and second home network devices based on the received information.

For example, if the first home network devices include two microwave ovens and one heating controller, the management server 530 may allocate device identifiers MW1, MW2, and HC to the two microwave ovens and the heating controller, respectively. Each device identifier may consist of any combination of numerals or characters.

The management server 530 may receive a request for allocating IP addresses to the respective first and second home network devices from the repeater 520 and the second home network controller 512. Upon receipt of the request, the management server 530 may assign IP addresses to the respective first and second home network devices.

Further, the first and second home network devices may be located within the same or different households (i.e. indoor home networks). If the first and second home network devices are within different households, the management server 530 may also allocate home identifiers used to identify the different households.

For example, in order to identify devices within different households in the same apartment complex, the management server 530 may allocate a home identifier such as the number of apartment unit within the apartment complex to which each household belongs and the number of the household, together with numbers assigned to the respective devices within the household.

At step 630, the management server 530 uses the device identifiers to relay communication between the first and second home network devices.

Alternatively, as described above, the management server 530 may use IP addresses and home identifiers in conjunction with the device identifiers to relay communication between the first and second home network devices.

As described above, the present invention enables communication between devise connected to both existing and new communication networks. The present invention also allow communication with the Internet via a communication network with wide bandwidth and high QoS while sustaining services provided via an existing communication network.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs).

While this invention has been particularly shown and described with reference to preferred embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A network system for relaying communication between devices, the system comprising:
   a first home network controller which controls first home network devices within a household;

a repeater that is connected to the Internet via a first communication network and which relays communication between the Internet and the first home network controller;

a second home network controller that is connected to the Internet via a second communication network and which relays communication between the Internet and each of second home network devices within the household; and a management server that is connected to the Internet and relays communication between the first and second home network devices within the household via the Internet, wherein the management server is connected to the first and second communication networks via the Internet and enables service interaction between the first and second home network controllers, wherein the first and second home network devices communicate using the first and second communication networks, respectively, wherein the second communication network has wider bandwidth and higher QoS (Quality of Service) than the first communication network.

2. The system of claim 1, wherein the management server receives information about the first and second home network devices, assigns device identifiers to the first and second home network devices based on the received information, and relays communication between the first and second home network devices using the device identifiers.

3. The system of claim 2, wherein, upon receipt of a request for allocating IP addresses to the respective first and second home network devices, the management server assigns IP addresses to the first and second home network devices and relays communication between the first and second home network devices using the IP addresses together with the device identifiers.

4. The system of claim 2,
wherein, if the first and second home network controllers are located within the different households, the management server relays the communication using home identifiers identifying households together with the device identifiers.

5. The system of claim 2, wherein the information about the first and second home network devices includes a number of the first and second home network devices respectively connected to the first and second home network controllers and information about each type of the home network devices.

6. The system of claim 1, wherein the first home network controller is connected to the repeater using RS-485 or Local Area Network communication.

7. The system of claim 1, wherein the first home network controller comprises an interphone, the repeater comprises security surveillance equipment, connected to a plurality of interphones within different households, which controls entry and access to the households, and the second home network controller comprises a set-top box.

8. The system of claim 1, wherein the first home network devices include at least one of a lighting switch, a heating controller, a gas valve controller, and a door lock.

9. The system of claim 1, wherein the second home network devices include at least one of a television, a personal computer, and an Internet phone.

10. The system of claim 1, wherein the second communication network has a wider bandwidth and higher Quality of Service than the first communication network.

11. A method for relaying communication in a management server between first and second home network devices respectively communicating with the Internet via first and second communication networks,
the method comprising:
receiving information about the first and second home network devices;
assigning device identifiers to the first and second home network devices based on the received information; and
relaying communication between the first and second home network devices using the device identifiers via the Internet,
wherein the second communication network has wider bandwidth and higher QoS (Quality of Service) than the first communication network, wherein the management server is connected to the Internet and relays communication between the first and second home network devices within a household via the Internet, wherein the management server is connected to the first and second communication networks via the Internet and enables service interaction between the first and second home network devices.

12. The method of claim 11, further comprising:
receiving a request for allocating IP addresses to the first and second home network devices; and,
assigning IP addresses to the first and second home network devices in response to the request,
wherein the relaying of the communication comprises relaying communication using the IP addresses together with the device identifiers.

13. The method of claim 11,
wherein, if the first and second home network devices are located within the different households, the relaying of the communication comprises relaying the communication using home identifiers identifying the different households together with the device identifiers.

14. The method of claim 11, wherein the information about the first and second home network devices includes a number of the first and second home network devices and information about each type of the home network devices.

15. The method of claim 13, wherein the first home network devices include at least one of a lighting switch, a heating controller, a gas valve controller, and a door lock.

16. The method of claim 11, wherein the second home network devices include at least one of a television, a personal computer, and an Internet phone.

17. A network system for relaying communication between devices, the system comprising:
a first network device which communicates with the Internet via a first communication network;
a second network device which communicates with the Internet via a second communication network, different from the first communication network, wherein the second communication network has wider bandwidth and higher QoS (Quality of Service) than the first communication network;
means for receiving information identifying the first and second network devices and for assigning device identifiers to the first and second network devices based on the received information, wherein the means for receiving is connected to the first and second communication networks via the Internet and enables service interaction between the first and second network devices;
means for relaying, via the internet, communication between the first network device and the second network device, wherein the means for relaying is connected to the Internet and relays communication between the first and second home network devices within a household via the Internet.

* * * * *